Jan. 9, 1962   R. LUCIEN   3,016,111
MONODISC STIRRUP BRAKES
Filed May 5, 1959
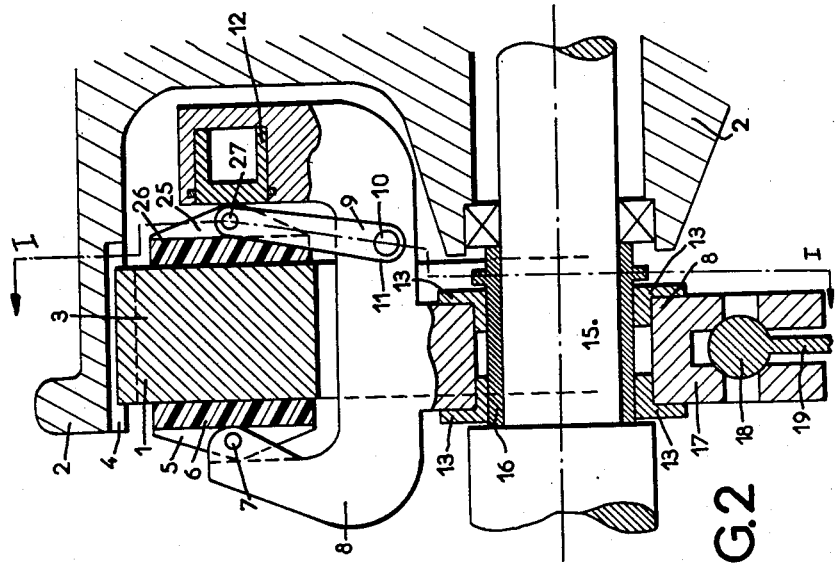
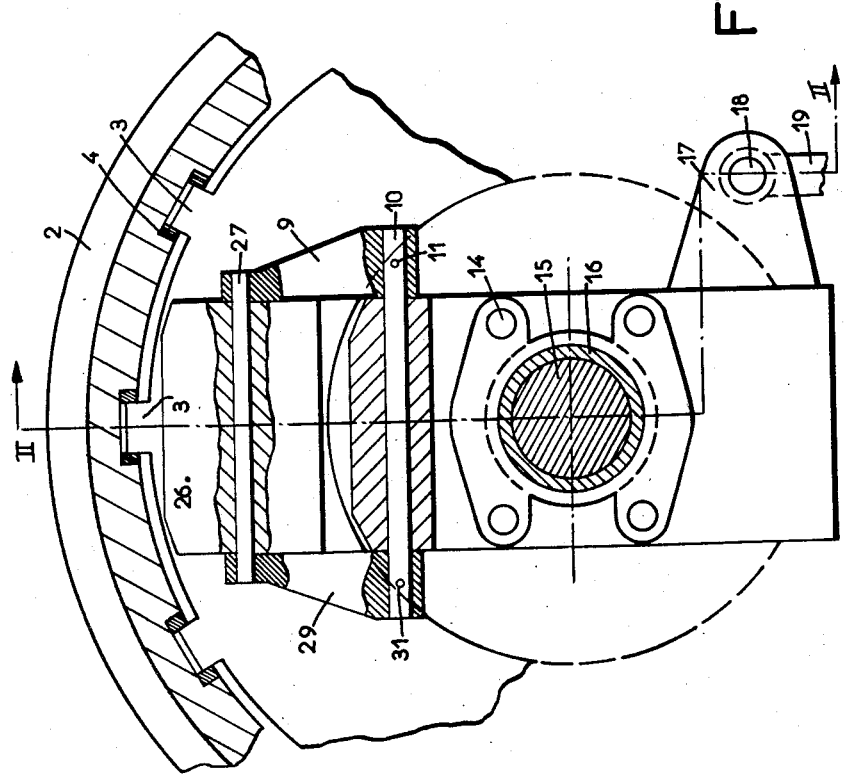

3,016,111
MONODISC STIRRUP BRAKES
Rene Lucien, Neuilly-sur-Seine, France, assignor to Recherches Etudes Production R.E.P., Paris, France, a corporation of France
Filed May 5, 1959, Ser. No. 811,225
Claims priority, application France May 7, 1958
1 Claim. (Cl. 188—73)

This invention relates to a brake of the monodisc type, and more particularly, this invention relates to a jack brake of the monodisc type having a brake stirrup and a fixed part.

The advantage of a monodisc brake of the stirrup type is its great simplicity. However, in order to ensure the proper working of this type of brake, it is necessary to mount the supports of the friction linings on parallel shafts which remain parallel to the plane of the disc and are capable of absorbing the deformations of conicity and buckling without producing vibrations or losses in efficiency which may have the effect of disturbing the operation of the said brake.

According to the present invention, it is proposed to provide three shafts which are substantially parallel to the plane of the brake disc, with two of the shafts being fixed and another one of the shafts being movable so as to remain substantially parallel to the plane of the brake disc. Connecting rods are provided to couple one of the fixed shafts to the movable shaft with supports being provided to couple a friction lining to the movable shaft and the other stationary shaft in opposed relationship to each other on opposite sides of the brake disc. Brake torque transmitting means are also provided and includes an arm mounted on a swivel which is coupled to the fixed part.

The present invention has for its primary object the provision of a device for the transmission of braking torque from the friction linings up to the fixed parts, the transmission device being arranged so as to prevent the lining from engaging slantwise in the course of operation with a view to ensure that the wear is as even as possible and to avoid vibrations during braking.

Another object of the present invention is to provide a braking system in accordance with which it is possible to vary the number of stirrups which all have the same shape and consist of the same elements and thus to obtain a series of brakes having stepped ranges of power since their braking torques are proportional to the number of stirrups.

A further object of the present invention is to provide a braking system in accordance with which the rotating part of the braking elements is reduced to the disc, and consequently, the weight of the rotating part of the braking elements is extremely small with respect to the weight of the rolling members, thus producing a corresponding reduction of the inertia of rotation of the group of rotating parts.

The new arrangements which are characteristic features of the invention will be better understood by means of the description which follows below, reference being made therein to the accompanying drawing; it should be definitely understood, however, that the figures have the sole purpose of describing the invention and are not intended to constitute in any sense a limitation of the invention:

FIG. 1 illustrates an arrangement shown in elevation in accordance with the invention taken on line I—I of FIG. 2.

FIG. 2 illustrates a side view of the arrangement taken on line II—II of FIG. 1.

In accordance with a preferred arrangement of the device for the transmission of the braking torque provided by the present invention, the braking torque is transmitted on the one hand by the stirrup on the side having a fixed point and on the other hand on the side opposite to the fixed point, by connecting rods rigidly fixed to a shaft mounted on the stirrup; this prevents the lining from engaging slantwise during operation, so as to ensure that wear takes place as evenly as possible and to reduce vibrations.

The preferred arrangement in accordance with the invention will be described with reference to FIGS. 1 and 2, which are given by way of example only and not in any sense by way of limitation and which illustrate the presently preferred mode of practicing the invention.

On these two figures only a single stirrup is shown, but it is obvious that the brake may just as easily comprise a number of stirrups spaced around the general axis of rotation.

In FIGS. 1 and 2, the braking disc 1 is driven by the wheel 2 by means of bosses 3 engaged in slots 4 in the wheel 2 in accordance with a known method of assembly, giving the disc a slight freedom of movement parallel to its own axis. On the fixed point or stationary side, the support 5 of the friction lining 6 is mounted on a shaft 7; this shaft 7 is mounted parallel to the plane of the disc 1, in the brake stirrup 8. On the side opposite to the stationary side, the support 25 of the friction lining 26 is mounted on a shaft 27; this shaft 27 is mounted parallel to the plane of the disc 1, on two connecting-rods 9 and 29 which are themselves mounted on a shaft 10 by means of keys 11 and 31; this shaft 10 is mounted parallel to the plane of the disc 1, in the brake-stirrup 8.

The operation of the brake takes place as follows: the gripping pressure of the friction linings 6 and 26 is applied by a jack 12 mounted in one of the arms of the brake stirrup 8. The braking torque is transmitted on the fixed point or stationary side by means of the support 5 of the lining 6, to the shaft 7 and to the stirrup 8; on the side opposite the stationary side, the said braking torque is transmitted by means of the support 25 of the lining 26 to the shaft 27 and by the connecting-rods 9 and 29 to the shaft 10 and to the brake stirrup 8.

The brake stirrup 8 is mounted on rings 13, the whole being assembled together by means of bolts 14; the rings 13 rest on the shaft 15 by the intermediary of a ring 16. The braking torque is transmitted from the brake stirrup 8 by means of an arm 17 and by a swivel 18 mounted on a fixed part 19.

While there has been shown and described what is considered to be the preferred embodiment of this invention, it will be obvious to those skilled in the art that various changes and modifications may be made therein without departing from the scope of the invention.

What I claim is:

A jack brake comprising an axially displaceable brake disc, a brake stirrup operatively associated with said disc, a fixed part, first and second shafts fixedly coupled to the brake stirrup and substantially parallel to the brake disc on opposite sides thereof, a third shaft movably associated with the brake stirrup and substantially parallel to the plane of the brake disc, first and second supports each carrying a friction lining, said first support being pivotally coupled to said first shaft, said second support being pivotally coupled to said third shaft and movable therewith, means for engaging and displacing said second support, means including connecting rods of equal length movably coupling said third shaft to said second shaft to remain substantially parallel to the plane of the brake disc for all movements of said third shaft, and means for transmitting braking torque from the brake stirrup to the fixed part including a swivel mounted on the fixed part and an arm mounted on said swivel.

References Cited in the file of this patent

UNITED STATES PATENTS

| | | |
|---|---|---|
| 2,115,083 | Pierce | Apr. 26, 1938 |

FOREIGN PATENTS

| | | |
|---|---|---|
| 1,047,807 | France | July 29, 1953 |
| 1,101,244 | France | Apr. 20, 1955 |
| 1,129,639 | France | Sept. 10, 1956 |
| 1,037,217 | Germany | Aug. 21, 1958 |